(12) United States Patent
Hille

(10) Patent No.: US 9,097,996 B2
(45) Date of Patent: Aug. 4, 2015

(54) SILICON DIOXIDE POWDER HAVING SPECIAL SURFACE PROPERTIES AND TONER COMPOSITION CONTAINING SAID POWDER

(75) Inventor: Andreas Hille, Lörrach (DE)

(73) Assignee: Evonik Degussa GmbH, Essen (DE)

( * ) Notice: Subject to any disclaimer, the term of this patent is extended or adjusted under 35 U.S.C. 154(b) by 276 days.

(21) Appl. No.: 13/810,834

(22) PCT Filed: Jul. 6, 2011

(86) PCT No.: PCT/EP2011/061357
§ 371 (c)(1),
(2), (4) Date: Mar. 29, 2013

(87) PCT Pub. No.: WO2012/010416
PCT Pub. Date: Jan. 26, 2012

(65) Prior Publication Data
US 2013/0204029 A1  Aug. 8, 2013

(30) Foreign Application Priority Data
Jul. 21, 2010 (DE) .......................... 10 2010 031 585

(51) Int. Cl.
| | |
|---|---|
| *C07F 7/02* | (2006.01) |
| *G03G 9/08* | (2006.01) |
| *B82Y 30/00* | (2011.01) |
| *C01B 33/18* | (2006.01) |
| *C09C 1/30* | (2006.01) |
| *G03G 9/097* | (2006.01) |
| *B32B 5/16* | (2006.01) |

(52) U.S. Cl.
CPC ............... *G03G 9/0819* (2013.01); *B32B 5/16* (2013.01); *B82Y 30/00* (2013.01); *C01B 33/18* (2013.01); *C01B 33/183* (2013.01); *C09C 1/30* (2013.01); *C09C 1/3081* (2013.01); *G03G 9/09716* (2013.01); *G03G 9/09725* (2013.01); *C01P 2002/02* (2013.01); *C01P 2004/50* (2013.01); *C01P 2004/64* (2013.01); *C01P 2006/12* (2013.01); *C01P 2006/14* (2013.01); *C01P 2006/16* (2013.01); *C01P 2006/19* (2013.01); *Y10T 428/2982* (2015.01)

(58) Field of Classification Search
USPC .............................................. 556/9, 400, 472
See application file for complete search history.

(56) References Cited

U.S. PATENT DOCUMENTS

| | | |
|---|---|---|
| 2003/0082090 A1 | 5/2003 | Blume et al. |
| 2005/0103231 A1 | 5/2005 | Geisselmann et al. |
| 2006/0093543 A1 | 5/2006 | Morters et al. |
| 2006/0155042 A1 | 7/2006 | Schumacher et al. |
| 2006/0155052 A1 | 7/2006 | Schumacher et al. |
| 2006/0201647 A1 | 9/2006 | Schumacher et al. |
| 2008/0141904 A1 | 6/2008 | Barthel et al. |
| 2008/0290317 A1* | 11/2008 | Hille et al. .................. 252/79.1 |
| 2009/0123859 A1 | 5/2009 | Moribe et al. |

FOREIGN PATENT DOCUMENTS

| | | | |
|---|---|---|---|
| CN | 1726169 A | 1/2006 | |
| CN | 1803603 A | 7/2006 | |
| CN | 1803604 A | 7/2006 | |
| EP | 1 295 850 | 3/2003 | |
| EP | 1 997 776 | 12/2008 | |
| JP | 2006-523172 A | 10/2006 | |
| JP | 2008-529949 A | 8/2008 | |
| JP | 2009-122175 A | 6/2009 | |
| JP | 2012-027142 | * 2/2012 | ............ G03G 9/08 |
| JP | 2012-27142 A | 2/2012 | |
| WO | 03 054089 | 7/2003 | |

OTHER PUBLICATIONS

International Search Report Issued Sep. 19, 2011 in PCT/EP11/61357 Filed Jul. 6, 2011.

* cited by examiner

*Primary Examiner* — Sudhakar Katakam
*Assistant Examiner* — Pancham Bakshi
(74) *Attorney, Agent, or Firm* — Oblon, McClelland, Maier & Neustadt, L.L.P.

(57) ABSTRACT

The invention relates to silicon dioxide powder which is present in the form of aggregated primary particles having an average diameter of at least 40 nm and a ratio of the BET surface area to the STSA surface area of at least 3.5. The invention also relates to a toner composition containing said silicon dioxide powder.

20 Claims, No Drawings

SILICON DIOXIDE POWDER HAVING SPECIAL SURFACE PROPERTIES AND TONER COMPOSITION CONTAINING SAID POWDER

The invention relates to a silica powder with specific surface properties and to the preparation thereof. The invention further relates to a toner composition.

DE-A-10145162 discloses a hydrophilic fumed silica in the form of aggregated primary particles with a mean particle size of less than 100 nm, which preferably has a specific surface area of 25 to 500 m$^2$/g with minimal surface roughness. DE-A-102004063762 discloses a hydrophilic fumed silica in the form of aggregated primary particles with a mean particle size of 0.5-1000 nm, which preferably has a specific surface area of 1 to 1000 m$^2$/g. DE-A-102005007753 discloses a hydrophilic fumed silica in the form of aggregated primary particles with a mean particle size of 0.5-1000 nm, which preferably has a specific surface area of more than 10 m$^2$/g, preferably 75 to 350 m$^2$/g. In the patent applications cited, the fumed silica preferably has a fractal dimension of the mass of less than or equal to 2.8.

DE-A-19756840 discloses a fumed silica which has a BET surface area between 30 and 150 m$^2$/g and a fractal BET dimension of less than 2.605. The silica thus obtained can be used, for example, for polishing. This silica is obtained by maintaining, in a flame hydrolysis process, a hydrogen ratio gamma of less than 1 and at the same time an oxygen ratio lambda likewise of less than 1. In this context, gamma is the ratio of hydrogen fed in plus hydrogen from the raw materials relative to stoichiometrically required hydrogen. Lambda is the ratio of oxygen fed in to stoichiometrically required oxygen.

EP-A-1997776 discloses a fumed silica powder with low thickening action, which is present in the form of aggregated primary particles, and has an STSA surface area of 10 to 500 m$^2$/g, a thickening action based on the STSA surface area of 4 to 8 mPas·g/m$^2$ and a micropore volume of 0.03 to 0.07 cm$^3$/g. The primary particle diameters are preferably less than 40 nm.

It was an object of the present invention to provide particles which, owing to their size and their inner and outer structures, are capable of exhibiting good adhesion properties on surfaces in the event of mechanical stress on these surfaces, for instance shearing. It was a further object of the invention to provide a process for preparing these particles.

The invention provides a silica powder which is in the form of aggregated primary particles having a mean diameter of at least 40 nm, preferably 40 to 70 nm, more preferably >50 to 60 nm and a ratio of the BET surface area to STSA surface area of at least 3.5, preferably 3.5 to 7, more preferably 3.8 to 6.

Primary particles are understood in the context of the present invention to mean particles which are formed at first in the reaction, and which can coalesce later in the reaction to form aggregates.

In the context of the invention, aggregates are understood to mean primary particles of similar structure and size which have coalesced with one another, the surface area of which is smaller than the sum of the individual isolated primary particles. Several aggregates or else individual primary particles may combine further to form agglomerates. Aggregates or primary particles are in point contact with one another. Depending on their degree of fusion, agglomerates can be separated again by introduction of energy.

The inventive silica powder preferably has a BET surface area of 100 to 400 m$^2$/g and more preferably of 200 to 300 m$^2$/g. The BET surface area is determined to DIN ISO 9277.

The BET surface area, the STSA surface area and the micropore volume are determined by measuring the N$_2$ adsorption isotherms at 77K. Prior to the measurement, the silica powder is degassed at 200° C. for 1 h under reduced pressure.

The STSA surface area characterizes the external surface area of the underlying particles of the silica powder, i.e. without taking account of the surface area caused by micropores. The STSA surface area is determined to ISO 18852 using the specific layer thickness equation $$t=(26.6818/(0.0124806-\log(p/p_0)))^{0.4},$$

where p=gas pressure and p0=saturation vapour pressure of the adsorptive at the measurement temperature, both with the unit Pa.

The same layer thickness equation is used to determine the micropore volume by the t method (DIN 66135-2).

The mean primary particle diameter is preferably determined by evaluation of TEM images (TEM=transmission electron microscope).

In a particular embodiment, the inventive silica powder has a thickening action based on the STSA surface area of more than 8 mPas·g/m$^2$, more preferably 8 to 12 mPas·g/m$^2$, most preferably 9 to 11 mPas·g/m$^2$.

The thickening action (in mPas) is determined in a dispersion of the silica powder in an unsaturated polyester resin with a viscosity of 1300±100 mPas at a temperature of 22° C. and measured with a rotary viscometer at a shear rate of 2.7 s$^{-1}$ and a temperature of 25° C. Suitable unsaturated polyester resins include cocondensates formed from ortho- or meta-phthalic acid and maleic acid or fumaric acid, or the anhydrides thereof, and a low molecular weight diol, for example ethylene glycol, 1,2- or 1,3-propanediol, 1,2-, or 1,3- or 1,4-butanediol or neopentyl glycol ((CH$_3$)$_2$C(CH$_2$OH)$_2$), or polyols such as pentaerythritol, preferably dissolved in an amount of 30 to 80% by weight, preferably 60 to 70% by weight, in an olefinic reactive diluent as a solvent, for example monostyrene. The viscosity of the polyester resin is 1300+/−100 mPas at a temperature of 22° C. 7.5 g of silica powder are added to 142.5 g of polyester resin at a temperature of 22° C. and dispersed by means of a dissolver at 3000 min$^{-1}$. 60 g of this dispersion are admixed with a further 90 g of the unsaturated polyester resin, and the dispersing operation is repeated. An example of a suitable unsaturated polyester resin is Ludopal® P6, BASF.

In a further particular embodiment, the inventive silica powder has a micropore volume of preferably at least 0.07 cm$^3$/g, more preferably 0.07 to 0.09, most preferably 0.072 to 0.080.

The fractal dimension $D_m$ of the inventive silica powder may preferably be at least 2.80, more preferably 2.80 to 2.90 and most preferably 2.83 to 2.87. $D_m$ is determined by N$_2$ adsorption in the pressure range $p/p_0$=0.5 to 0.8 by the fractal BET theory for multilayer adsorption by the method specified by Pfeifer, Obert and Cole (Proc. R. Soc. London, A 423, 169 (1989)).

Surface roughness can be quantified by means of the theory of fractals. Fractals are structures which are similar on different length scales. Many properties of fractals can be described by power laws. When, for example, the increase of the mass m with the radius r is examined, the mass fractal dimension $d_m$=3 is obtained for the limiting case of a compact sphere. For a structure which has cavities and pores, the result is a mass fractal dimension $d_m$<3. It is also possible for surfaces to possess fractal properties. In this case, the size of the surface area varies with the radius. For a perfectly smooth surface, the result is 5. For fumed silicas, the mass fractal dimension is generally in the range from 1.5 to 2.0, and the surface-based dimensions approx. 2.0.

The DBP absorption, unit g $SiO_2$/100 g DBP, based on the STSA surface area, unit $m^2/g$, of the inventive silica powder may preferably be 3.5 g/100 g $m^2g^{-1}$ or higher, more preferably 3.5 to 5 g/100 g $m^2g^{-1}$. Dibutyl phthalate absorption is measured with a RHEOCORD 90 system from Haake, Karlsruhe. For this purpose, 8 g of the silica powder, accurately to 0.001 g, are introduced into an kneading chamber, which is closed with a lid, and dibutyl phthalate is metered in through a hole in the lid with a preset metering rate of 0.0667 ml/s. The kneader is operated with a motor speed of 125 revolutions per minute. On attainment of the torque maximum, the kneader and the DBP metering are automatically switched off. The amount of DBP consumed and the amount of particles weighed in are used to calculate the DBP absorption according to: DBP absorption (g/100 g)=(consumption of DBP in g/starting weight of particles in g)×100.

The invention further provides a process for preparing the inventive silica powder, in which
  a) a mixture comprising in each case one or more hydrolysable and/or oxidizable silicon compounds, oxygen-containing gases and primary combustion gases which react with the oxygen-containing gases to form water is supplied to a flame burning from a burner in a flame tube,
  b) separately therefrom, one or more secondary combustion gases are introduced into the flame tube from a tube surrounding the burner, and
  c) at a later time, one or more tertiary combustion gases are supplied to this reaction mixture within the flame tube,
  d) then the solids are removed from the reaction mixture,
where
  $gamma_1 < 1$, $gamma_2 < 1$ and $gamma_3 < 1$ and
  $gamma_{1/2} = gamma_1 + gamma_2 < 1$
  $gamma_{total} = gamma_1 + gamma_2 + gamma_3 > 1$ and
  $lambda_1 > 1$ where
  $gamma_1$=primary combustion gas/stoichiometrically required combustion gas
  $gamma_2$=secondary combustion gas/stoichiometrically required combustion gas
  $gamma_3$=tertiary combustion gas/stoichiometrically required combustion gas and
  $lambda_1$=oxygen in the oxygen-containing gas/stoichiometrically required oxygen A "later time" shall be understood to mean that the tertiary combustion gas is added at a time at which the structure and the properties of the silica particles can still be influenced. The tertiary combustion gas is preferably added 0.1 to 30 ms, more preferably 1 to 10 ms and most preferably 2 to 6 ms after addition of the secondary combustion gas to the reaction mixture.

Pyrogenic processes, especially flame hydrolysis processes, are typically performed in such a way that the starting materials are in such a stoichiometric ratio relative to one another that the combustion gas supplied is at least sufficient to hydrolyse the feedstocks. The amount of combustion gas required for that purpose is referred to as the stoichiometric amount of combustion gas.

In the process according to the invention, the ratio of the primary combustion gas supplied (in mol) to the stoichiometrically required amount of combustion gas just defined (in mol) is referred to as $gamma_1$. $Gamma_1$ in the process according to the invention is less than 1. $Gamma_1$=(primary combustion gas/stoichiometric combustion gas)<1.

In addition, one or more secondary combustion gases are used in the process according to the invention. These are introduced into the flame tube separately from the primary combustion gas, from a tube surrounding the burner. The ratio of the secondary combustion gas supplied (in mol) to the stoichiometrically required amount of combustion gas (in mol) is referred to as $gamma_2$. $Gamma_2$ in the process according to the invention is less than 1. $Gamma_2$=(primary combustion gas/stoichiometric combustion gas)<1.

In addition, a tertiary combustion gas is used in the process according to the invention. This is introduced into the flame at a later time than the primary combustion gas and the secondary combustion gas. The ratio of the tertiary combustion gas supplied (in mol) to the stoichiometrically required amount of combustion gas (in mol) is referred to as $gamma_3$. $Gamma_3$ in the process according to the invention is less than 1. $Gamma_3$=(primary combustion gas/stoichiometric combustion gas)<1.

In addition, for the process according to the invention: $gamma_{1/2} = gamma_1 + gamma_2 < 1$ and $gamma_{total} = gamma_1 + gamma_2 + gamma_3 > 1$.

For a preferred embodiment of the process, $gamma_1 > gamma_2$.

For a further preferred embodiment of the process, $gamma_1 < gamma_3$ and/or $gamma_2 < gamma_3$.

For a further preferred embodiment of the process, $0.2 \leq gamma_1 \leq 0.6$ and $0.4 \leq gamma_3 \leq 0.8$.

Secondary combustion gas and/or tertiary combustion gas can be supplied, for example, by means of a ring nozzle.

Pyrogenic processes, especially processes produced by flame hydrolysis, are typically performed in such a way that an amount of oxygen used, for example from the air, is at least sufficient to convert the silicon starting compounds to silica and to convert combustion gas. This amount of oxygen is referred to as the stoichiometric amount of oxygen.

The ratio of the oxygen supplied in the form of an oxygen-containing gas (in mol) to the stoichiometrically required amount of oxygen just defined (in mol) is referred to as $lambda_1$. $Lambda_1$ in the process according to the invention is greater than 1. $Lambda_1$=primary oxygen/stoichiometric oxygen>1. In a preferred embodiment, $1 < lambda_1 \leq 10$, more preferably $3 \leq lambda_1 \leq 7$.

In the process according to the invention, one or more hydrolysable silicon compounds are used. Hydrolysable silicon compounds are understood to mean those which are converted to silica by reaction with water. The silicon compounds can be introduced in vaporous form or as a solution in a solvent with which no reaction takes place. The silicon compounds are preferably introduced in vaporous form.

The hydrolysable silicon compounds are preferably silicon halides, silicon organohalides and/or silicon alkoxides. Particular preference may be given to using $SiCl_4$, $MeSiCl_3$, $Me_2SiCl_2$, $Me_3SiCl$, $Me_4Si$, $HSiCl_3$, $Me_2HSiCl$, $MeEtSiCl_2$, $Cl_3SiSiMeCl_2$, $Cl_3SiSiMe_2Cl$, $Cl_3SiSiCl_3$, $MeCl_2SiSiMeCl_2$, $Me_2ClSiSiMeCl_2$, $Me_2ClSiSiClMe_2$, $Me_3SiSiClMe_2$, $Me_3SiSiMe_3$, $MeEtSiCl_2$, tetraethoxysilane, tetramethoxysilane, D4-polysiloxane and/or D5-polysiloxane. Very particular preference is given to using $SiCl_4$.

The combustion gas used may preferably be hydrogen, methane, ethane, propane, butane, natural gas and/or carbon monoxide. Particular preference is given to hydrogen.

The oxygen-containing gas used is preferably air (primary air, secondary air). However, it is also possible to enrich the air with oxygen, usually up to an oxygen content of 35% by volume.

After the removal of gaseous substances, the silica powder can be treated with steam. This treatment serves primarily to remove chloride-containing groups from the surface. At the same time, this treatment reduces the number of agglomerates. The process can be performed continuously, by treating the powder with steam, optionally together with air, in cocurrent or countercurrent. The temperature at which the treatment with steam is effected is between 250 and 750° C., preference being given to values of 450 to 550° C.

The invention further provides a process for preparing a surface-modified silica powder present in the form of aggregated primary particles, the surface of which or parts thereof is covered by chemically bound linear and/or branched alkylsilyl groups having 1 to 20 carbon atoms, in which the inventive silica powder is sprayed with one or more surface-modifying agents which are optionally dissolved in an organic solvent and have linear and/or branched alkylsilyl groups having 1 to 20 carbon atoms, or with which these groups are formed during the reaction, and the mixture is subsequently treated thermally at a temperature of 120 to 400° C. over a period of 0.5 to 8 hours, optionally under protective gas.

The surface-modifying agent is preferably selected from the group consisting of hexamethyldisilazane, dimethyldimethoxysilane, dimethyldiethoxysilane, trimethylmethoxysilane, methyltrimethoxysilane, butyltrimethoxysilane, dimethyldichlorosilane, trimethylchlorosilane and/or silicone oils.

The invention further provides a surface-modified silica powder present in the form of aggregated primary particles, the surface of which or parts thereof is covered by chemically bound linear and/or branched alkylsilyl groups having 1 to 20 carbon atoms, which is obtainable by the process according to the invention.

The invention further provides a toner composition comprising the inventive silica powder, preferably with a proportion of the silica powder of 0.1 to 10% by weight, based on the toner composition,

EXAMPLES

Example 1 (comparative example): 108 kg/h of silicon tetrachloride, 14 m³ (STP)/h of hydrogen (primary combustion gas) and 140 m³ (STP)/h air are mixed in a burner, and the mixture is ignited and burnt into a reaction chamber. An additional 21 m³ (STP)/h of hydrogen (secondary combustion gas) and 40 m³ (STP)/h of secondary air are introduced into the reaction chamber.

The powder formed is separated out in a downstream filter and then treated in countercurrent with air and steam at 520° C.

Example 2 (comparative example) is performed analogously to Example 1, except using the amounts of feedstock specified in Table 1.

Silica powder is obtained with the properties specified in Table 2.

Example 3 (according to invention): 100 kg/h of silicon tetrachloride, 10 m3 (STP)/h of hydrogen (primary combustion gas) and 155 m3 (STP)/h air, are mixed in a burner, and the mixture is ignited and burnt into a reaction chamber. An additional 5 m3 (STP)/h of hydrogen (secondary combustion gas) and 50 m3 (STP)/h of secondary air are introduced into the reaction chamber. An additional 17 m3 (STP)/h hydrogen (tertiary combustion gas) are introduced into the reaction chamber via a downstream ring nozzle. The powder formed is separated out in a downstream filter and then treated in countercurrent with air and steam at 520° C.

Examples 4 and 5 (according to invention) are performed analogously to Example 3, except with the amounts of feedstock specified in Table 1.

Silica powder is obtained with the properties specified in Table 2.

Example 6 (comparative example): 100 parts by weight of the silica powder from Example 1 are initially charged in a mixer and sprayed first with water and then with 25 parts by weight of hexamethylsilazane (HMDS). Thereafter, the reaction mixture is treated at 150° C. for 2 hours. The level of hydrophobicity is 99%.

Example 7 (according to invention): as Example 6, except using the silicon dioxide powder from Example 3 and 15 parts by weight of HMDS.

Example 8 (according to invention): as Example 6, except using the silicon dioxide powder from Example 4 and 20 parts by weight of HMDS. The level of hydrophobicity is 99%.

Example 9 (according to invention): as Example 6, except using the silicon dioxide powder from Example 5 and 20 parts by weight of HMDS. The level of hydrophobicity is 99%.

Example 10 (comparative example): toner composition 97 parts by weight of a negatively charged crude toner powder, produced by polymerization (from Sinonar), 2.5 parts by weight of the silicon dioxide powder surface-modified with HMDS from Example 6 and 0.5 part by weight of AEROSIL® RX200 are mixed together in a Henschel mixer at 5000 rpm for 1 minute.

Examples 11 to 13 (according to invention): analogous to Example 8, except using the hydrophobicized silicon dioxide powder from Example 7 to 9, rather than the hydrophobicized silicon dioxide powder from Example 6.

The triboelectric charge of Examples 10 to 13 is measured by mixing 2 g of the toner composition of Examples 10 to 13 in each case with 48 g of iron powder in each case in a 75 ml glass vessel, and storing the mixed powder at 20° C. and 60% humidity over a period of 24 hours. Subsequently, the mixed powder is treated in a mixer over a period of 1, 3, 10, 30 and 90 minutes, and the triboelectric charge is determined by means of the TB-200 measuring instrument, produced by Toshiba Chemical Corp. Table 3 shows the values determined. It is found that the toner compositions produced with the inventive silicon dioxide powder from Examples 11 to 13 undergo only a slight change in charge over time, whereas a distinct decrease is observed in the comparative example.

As SEM (scanning electron microscope) images show, the aggregated primary particles of the inventive silicon dioxide powder adhere particularly well to the surface, even in the event of mechanical stress on this surface.

TABLE 1

Feedstocks and amounts used; flame parameters

| Example | | 1* | 2* | 3 | 4 | 5 |
|---|---|---|---|---|---|---|
| $SiCl_4$ | kg/h | 108 | 108 | 100 | 100 | 100 |
| Primary $H_2$ | m³ (STP)/h | 14 | 20 | 10 | 12 | 13 |
| Secondary $H_2$ | m³ (STP)/h | 21 | 21 | 5 | 5 | 5 |
| Tertiary $H_2$ | m³ (STP)/h | — | — | 17 | 15 | 14 |
| Primary air | m³ (STP)/h | 140 | 140 | 155 | 155 | 155 |
| Secondary air | m³ (STP)/h | 40 | 40 | 50 | 50 | 50 |
| $gamma_1$ | | 0.50 | 0.71 | 0.38 | 0.46 | 0.50 |
| $gamma_2$ | | 0.74 | 0.74 | 0.19 | 0.19 | 0.19 |
| $gamma_3$ | | — | — | 0.65 | 0.57 | 0.53 |
| $gamma_{total}$ | | 1.24 | 1.45 | 1.22 | 1.22 | 1.22 |
| $lambda_1$ | | 4.13 | 2.90 | 6.28 | 5.26 | 4.86 |
| $lambda_{total}$ | | 1.67 | 1.43 | 2.67 | 2.67 | 2.67 |

TABLE 2

| | | Physicochemical properties | | | | |
|---|---|---|---|---|---|---|
| Example | | 1* | 2* | 3 | 4 | 5 |
| φ Primary particles | nm | 23 | 11 | 57 | 53 | 51 |
| BET surface area | m²g⁻¹ | 269 | 363 | 229 | 245 | 270 |
| STSA surface area | m²g⁻¹ | 118 | 214 | 41 | 57 | 71 |
| Thickening | mPas | 840 | 1435 | 450 | 520 | 610 |
| Micropore volume | cm³g⁻¹ | 0.063 | 0.069 | 0.078 | 0.074 | 0.071 |
| Fractality $D_m$ | — | 2.774 | 2.689 | 2.849 | 2.820 | 2.802 |
| DBP | g/100 g | 256 | 300 | 180 | 210 | 251 |
| BET/STSA | — | 2.28 | 1.70 | 5.58 | 4.46 | 3.80 |
| Thickening$_{STSA}$ | mPas/m²g⁻¹ | 7.12 | 6.71 | 10.98 | 9.12 | 8.59 |
| DBP$_{STSA}$ | g/100 g m²g⁻¹ | 2.17 | 1.40 | 4.39 | 3.68 | 3.53 |

*Comparative examples

TABLE 3

Toner composition-triboelectric charge (μC/g) as a function of time (min)

| Example | SiO₂ from example | 1 min | 3 min | 10 min | 30 min | 90 min |
|---|---|---|---|---|---|---|
| 10 | 6 | −21 | −18.5 | −16.5 | −14 | −10.5 |
| 11 | 7 | −15 | −15 | −15 | −14.5 | −14 |
| 12 | 8 | −14.5 | −15 | −14.5 | −14 | −14 |
| 13 | 9 | −17.5 | −16 | −15 | −14 | −15 |

The invention claimed is:

1. A silica powder, in a form of aggregated primary particles having a mean diameter of at least 40 nm and a ratio of a BET surface area to a STSA surface area of at least 3.5.

2. The silica powder of claim 1, wherein the BET surface area is 100 to 400 m²/g.

3. The silica powder of claim 1, having a thickening action based on the STSA surface area of more than 8 mPas·g/m².

4. The silica powder of claim 1, having a micropore volume of at least 0.07 cm³/g.

5. The silica powder of claim 1, having a fractal dimension Dm of at least 2.80.

6. The silica powder of claim 1, wherein a DBP absorption based on the STSA surface area is 3.5 g/100 g m²g⁻¹ or higher.

7. A process for preparing the silica powder of claim 1, the process comprising
a) supplying a mixture comprising one or more hydrolysable and/or oxidizable silicon compounds, an oxygen-comprising gas and a primary combustion gas which reacts with the oxygen-comprising gas to form water, to a flame burning from a burner in a flame tube,
b) separately introducing one or more secondary combustion gases into the flame tube from a tube surrounding the burner, and
c) at a later time, supplying one or more tertiary combustion gases to a reaction mixture within the flame tube, and
d) then removing at least one solid from the reaction mixture, where
gamma$_1$<1, gamma$_2$<1 and gamma$_3$<1 and
gamma$_{1/2}$=gamma$_1$+gamma$_2$<1
gamma$_{total}$=gamma$_1$+gamma$_2$+gamma$_3$>1 and
lambda$_1$>1 where
gamma$_1$=primary combustion gas/stoichiometrically required combustion gas
gamma$_2$=secondary combustion gas/stoichiometrically required combustion gas
gamma$_3$=tertiary combustion gas/stoichiometrically required combustion gas and
lambda$_1$=oxygen in the oxygen-containing gas/stoichiometrically required oxygen.

8. The process of claim 7, wherein gamma$_1$>gamma$_2$.

9. The process of claim 7, wherein (i) gamma$_1$<gamma$_3$, (ii) gamma$_2$<gamma$_3$, or both (i) and (ii).

10. The process of claim 7, wherein 0.2≤gamma$_1$≤0.6 and 0.4≤gamma$_3$≤0.8.

11. The process of claim 7, wherein the secondary combustion gas, the tertiary combustion gas, or both, are supplied by a ring nozzle.

12. The process of claim 7, wherein 1<lambda$_1$≤10.

13. The process of claim 7, further comprising introducing a further oxygen-comprising gas into the flame tube.

14. A process for preparing a surface-modified silica powder in a form of aggregated primary particles, a surface of which or parts thereof is covered by chemically bound linear and/or branched alkylsilyl groups having 1 to 20 carbon atoms, the process comprising spraying the silica powder of claim 1 with one or more surface-modifying agents which are optionally dissolved in an organic solvent and have linear and/or branched alkylsilyl groups having 1 to 20 carbon atoms, and subsequently thermally treating the sprayed silica powder at a temperature of 120 to 400° C. over a period of 0.5 to 8 hours, optionally under a protective gas.

15. The process of claim 14, wherein the surface-modifying agent is at least one selected from the group consisting of hexamethyldisilazane, dimethyldimethoxysilane, dimethyldiethoxysilane, trimethylmethoxysilane, methyltrimethoxysilane, butyltrimethoxysilane, dimethyldichlorosilane, trimethylchlorosilane and a silicone oil.

16. A surface-modified silica powder in a form of aggregated primary particles, a surface of which or parts thereof is covered by chemically bound linear and/or branched alkylsilyl groups having 1 to 20 carbon atoms, obtained by the process of claim 14.

17. A toner composition comprising the silica powder of claim 1.

18. The silica powder of claim 1, wherein the aggregated primary particles have a mean diameter of 40 to 70 nm.

19. The silica powder of claim 1, wherein the ratio of the BET surface area to the STSA surface area is in a range of 3.5 to 7.

20. The silica powder of claim 1, having a micropore volume of 0.07 to 0.09 cm³/g.

* * * * *